United States Patent [19]
Slattery

[11] Patent Number: 5,849,393
[45] Date of Patent: Dec. 15, 1998

[54] STRUCTURAL ELEMENT AND METHOD OF MAKING

[75] Inventor: Kevin T. Slattery, St. Charles, Mo.

[73] Assignee: McDonnell Douglas Corporation, Md.

[21] Appl. No.: 841,896

[22] Filed: Apr. 17, 1997

[51] Int. Cl.$^6$ .............................. B32B 3/00; B32B 31/00
[52] U.S. Cl. ..................... 428/172; 428/120; 428/167; 428/178; 52/793.1; 156/196; 156/290; 156/292; 156/293; 264/241
[58] Field of Search .......................... 428/178, 33, 116, 428/120, 167, 166, 1, 172; 52/793.1, 796.1, 790.1; 156/196, 290, 292, 293, 308.4, 219; 204/241, 248, 257

[56] References Cited

U.S. PATENT DOCUMENTS 5,273,806 12/1993 Lockshaw et al. ..................... 428/167
5,487,930 1/1996 Lockshaw et al. ..................... 428/53
5,508,085 4/1996 Lockshaw et al. ..................... 428/178

*Primary Examiner*—Donald Loney
*Attorney, Agent, or Firm*—Senniger, Powers, Leavitt & Roedel

[57] ABSTRACT

A structural element comprising a first member and a second member interengaged with one another. Each member has an inner layer formed from a machinable material and having a substantially smooth outer surface, and an outer layer having a substantially smooth inner surface of a shape generally complementary to the shape of the outer surface of the inner layer. The inner and outer layers are joined together such that the outer surface of the inner layer and the inner surface of the outer layer are in substantially continuous, face-to-face engagement with each other. The inner layer of the first member has a first formation machined therein. The structural element further comprises an element for interconnecting the first formation of the first member with the second member thereby to form the structural element.

20 Claims, 5 Drawing Sheets

STRUCTURAL ELEMENT AND METHOD OF MAKING

TECHNICAL FIELD

This invention relates generally to structural elements having interlocking structural members and more particularly to interlocking structural members formed from two materials.

BACKGROUND OF THE INVENTION

Structural elements such as wing sections of aircraft generally comprise a honeycomb core interposed between two relatively thin skin layers. The core and skin are preferably formed from material having a high strength to weight ratio. The honeycomb core is typically expensive, difficult to machine and not easily repaired. Furthermore, it is difficult to attach other parts to the honeycomb core. An alternative to the honeycomb core design is described in U.S. Pat. Nos. 5,273,806, 5,487,930 and 5,508,085, which are incorporated herein by reference. These patents disclose a structural element generally comprising two outer structures and an inner structure interposed between the outer structures. The inner structure comprises a closed figure of lateral and longitudinal ribs. In one embodiment, the ribs of the inner structure are bonded to the outer structures. The bond between the outer structure and inner structure is susceptible to failure due to the small surface area of bonding between the thin edges of the ribs and the outer structure. The strength of the bond is also reduced due to the location of the bondline near the outer surface of the structural element, where stresses on the structural element are high. This weak bond reduces the overall strength of the structural element.

In another embodiment, the structures are joined together by interlocking ribs and grooves. The grooves are typically formed on inner surfaces of the outer structures to mate with the ribs of the inner structure. The outer structures and inner structure are each generally formed from a single material such as metal or composite. The outer structures are generally formed from metal with grooves machined into the metal structures, since the composite material is generally difficult and expensive to machine. The metal is typically more dense and less stiff than composite material, thus the use of metal for the outer structures increases the weight and reduces the stiffness of the structural element.

DISCLOSURE OF INVENTION

The structural element of the present invention meets the above needs and overcomes the deficiencies of the prior art by providing a structural element having high strength and low weight, improved stiffness and improved reliability. The method of making the structural element reduces the number of processing steps required to manufacture the element and reduces the amount of tooling required for manufacturing, thus reducing the cost. Among the features of the present invention may be noted the provision of a structural element and method of making the structural element which eliminate fit problems between composite skins and metal structure, maximize the bonding area between the composite and metal material, and increase the strength of the bond between the skin and interposed structure. The present invention overcomes the limitations of the prior art designs and provides a structural element which is easy to manufacture, has high strength, low weight, increased stiffness, improved quality and reliability and is economical to manufacture.

Generally, a structural element of this invention comprises a first member and a second member interengaged with one another. Each member comprises an inner layer formed from a machinable material and having a substantially smooth outer surface, and an outer layer having a substantially smooth inner surface of a shape generally complementary to the shape of the outer surface of the inner layer. The inner and outer layers are joined together such that the outer surface of the inner layer and the inner surface of the outer layer are in substantially continuous, face-to-face engagement with each other. The inner layer of the first member has a first formation machined therein. The structural element further comprises means for interconnecting the first formation of the first member with the second member thereby to form the structural element.

In another aspect of the invention, a structural member for use in forming a structural element having the structural member and another structural member interengaged with one another, generally comprises an inner layer formed from a machinable material. The inner layer has a substantially smooth outer surface. The structural member further comprises an outer layer having a substantially smooth inner surface of a shape complementary to the shape of the outer surface of the inner layer. The inner and outer layers are joined together such that the outer surface of the inner layer and the inner surface of the outer layer are in substantially smooth, face-to-face engagement with each other. The inner layer has an interlocking formation machined therein for interconnecting the structural member with said other structural member.

A method of the present invention for forming a structural element generally includes the step of joining an inner layer formed of a machinable material to an outer layer in face-to-face relationship to form a first member. A first interlocking formation is machined into the inner layer of the first member and a second interlocking formation is machined into a machinable element. The first and second interlocking formations are then engaged to form the structural element.

Other objects and features will be in part apparent and in part pointed out hereinafter.

BRIEF DESCRIPTION OF DRAWINGS

Corresponding reference characters indicate corresponding parts throughout the several views of the drawings.

BEST MODES FOR CARRYING OUT THE INVENTION

Figure 1:
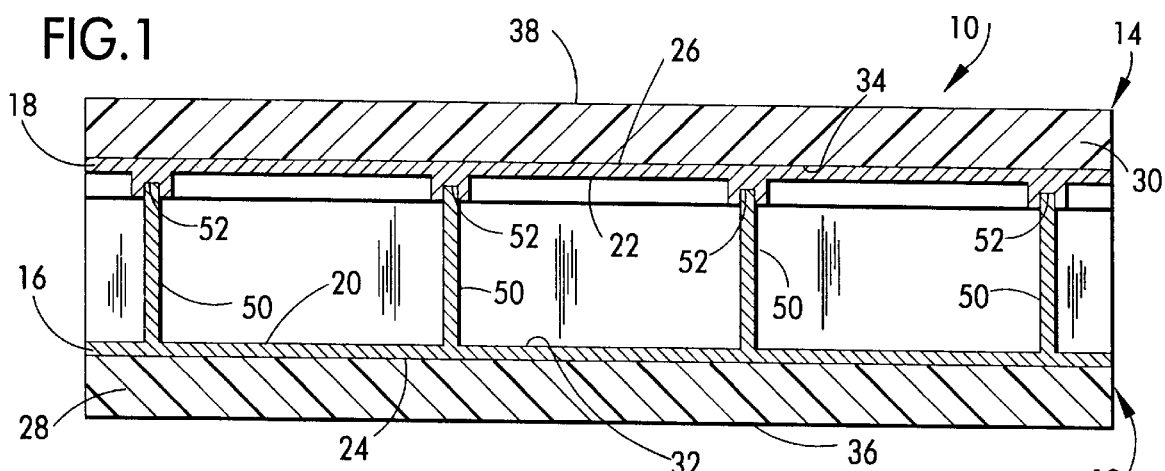
FIG. 1 is a cross-sectional view of a first embodiment of a structural element of the present invention.
Figure 2:
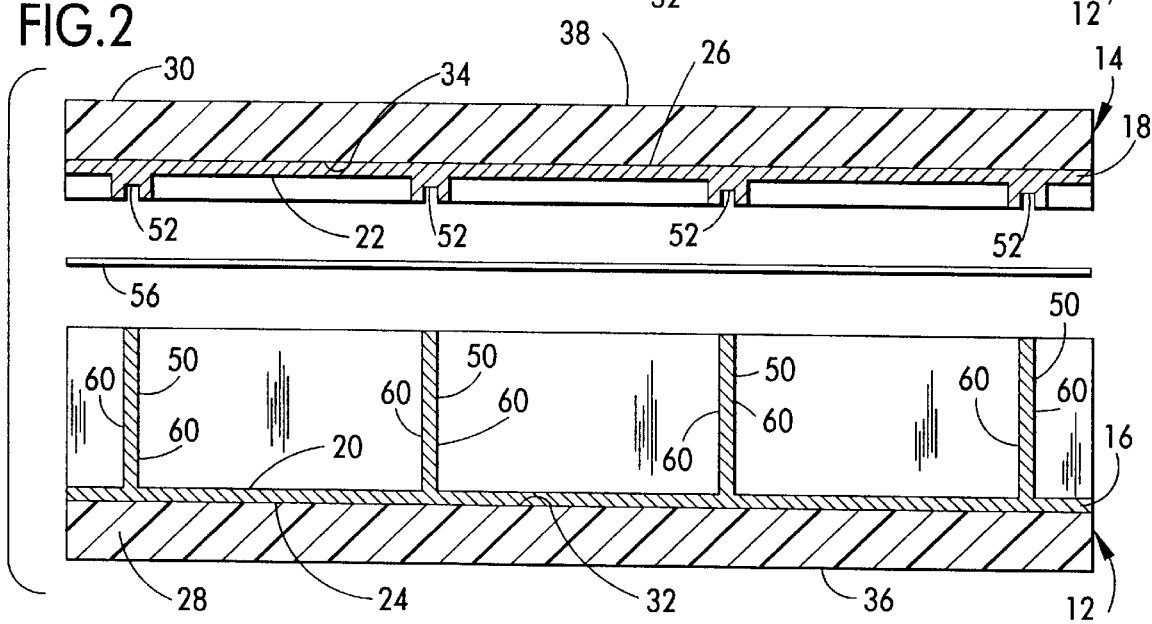
FIG. 2 is an exploded cross-sectional view of the structural element of FIG. 1.

Referring now to the drawings, and first to FIG. 1, a structural element of the present invention is generally indicated at 10. The structural element 10 is particularly constructed for use in forming structures, such as wings of an aircraft, which require a high strength to weight ratio and high stiffness. The structural element 10 comprises a first structural member and a second structural member (generally indicated at 12 and 14, respectively) interengaged with one another. Each member 12, 14 has a corresponding inner layer 16, 18 having an inner surface 20, 22 and outer surface 24, 26 and an outer layer 28, 30 having an inner surface 32, 34 and outer surface 36, 38 (FIG. 2). The outer surfaces 36, 38 of the outer layers 28, 30 are preferably smooth and continuous to provide an aerodynamic exterior surface desirable for aircraft wing skins.

The inner layers 16, 18 are formed from a machinable material so that interlocking formations may be readily machined directly into the inner layers of the structural members 12, 14. The inner layers 16, 18 are preferably formed from a metal material and may be formed from aluminum, for example, or any other suitable machinable material. It is to be understood that the term metal also includes materials such as metal oxides (e.g., aluminum oxide). The inner layers 16, 18 may also be formed from titanium or aluminum castings or forgings, for example. The outer layers 28, 30 are formed from a material which is preferably less dense than the material used for the inner layers 16, 18 to reduce the weight of the structural element 10. The outer layers 28, 30 may be formed from various types of composite materials including fiber-reinforced polymer matrix composites such as carbon/epoxy, aramid/phenolic, and glass/polyimide, for example. Epoxy or bis-maleimide resin systems reinforced with carbon, boron or glass may also be used, as well as other suitable composite materials. The outer layers 28, 30 may also be formed from metal or metal alloys such as aluminum-beryllium or aluminum-titanium.

Figure 3:
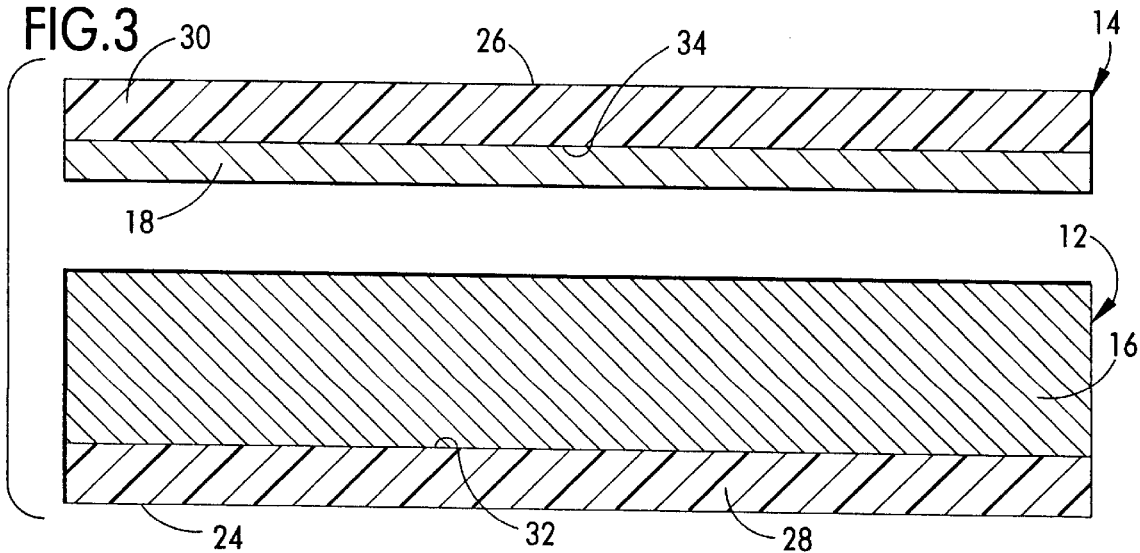
FIG. 3 is a cross-sectional view of a first and second member of the structural element prior to machining the members, with the members oriented as they are in the finished structural element.

The outer surfaces 24, 26 of the inner layers 16, 18 are substantially smooth, continuous and generally planar for engagement with respective inner surfaces 32, 34 of the outer layers 28, 30 which also have a substantially smooth, continuous, generally planar shape complementary to that of the outer surfaces of the inner layers (FIG. 3). The inner and outer layers 16, 18, 28, 30 are joined together with the outer surfaces 24, 26 of the inner layers and the inner surfaces 32, 34 of the outer layers in substantially continuous, face-to-face engagement with one another. Smooth is intended to mean that the surfaces are free of uneven regions which interfere with the bonding of the inner layers 16, 18 to the outer layers 28, 30. For example, the outer surfaces 24, 26 of the inner layers 16, 18 have no interlocking formations machined into them. However, small scale and microscopic unevenness, which is inherent in manufacturing and may even promote bonding are not excluded.

The inner and outer layers 16, 18, 28, 30 are preferably permanently joined together over substantially the entire area of engagement of their respective inner and outer layers. Various methods may be used to join the inner and outer layers 16, 18, 28, 30 together. For example, the inner and outer layers 16, 18, 28, 30 may be joined by cocuring (joining an uncured outer layer to the inner layer in one cure cycle to form an integral construction). The inner and outer layers 16, 18, 28, 30 may also be joined by cobonding (adhesively joining the inner layer to an uncured outer layer by a procedure which simultaneously cures both an adhesive and composite laminate). The inner layers 16, 18 may also be bonded to cured outer layers 28, 30 or attached to the outer layers by suitable fastening means. Other methods for connecting the inner and outer layers 16, 18, 28, 30 include diffusion bonding, roll bonding and explosion bonding. It is to be understood that other methods for connecting the inner and outer layers may be used without departing from the scope of this invention.

Figure 4:
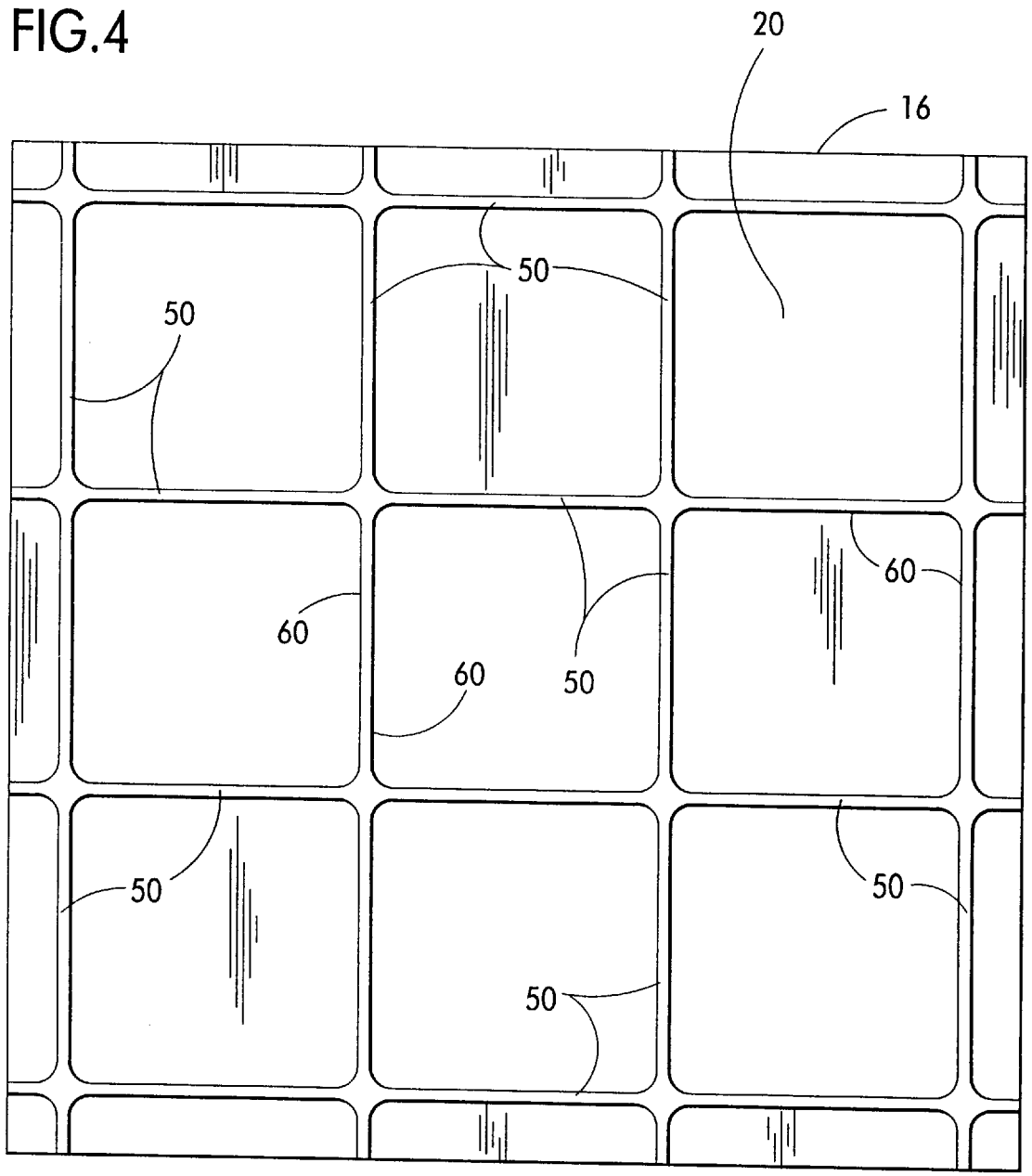
FIG. 4 is a plan view showing an inner layer of the first member of the structural element of FIG. 1.
Figure 5:
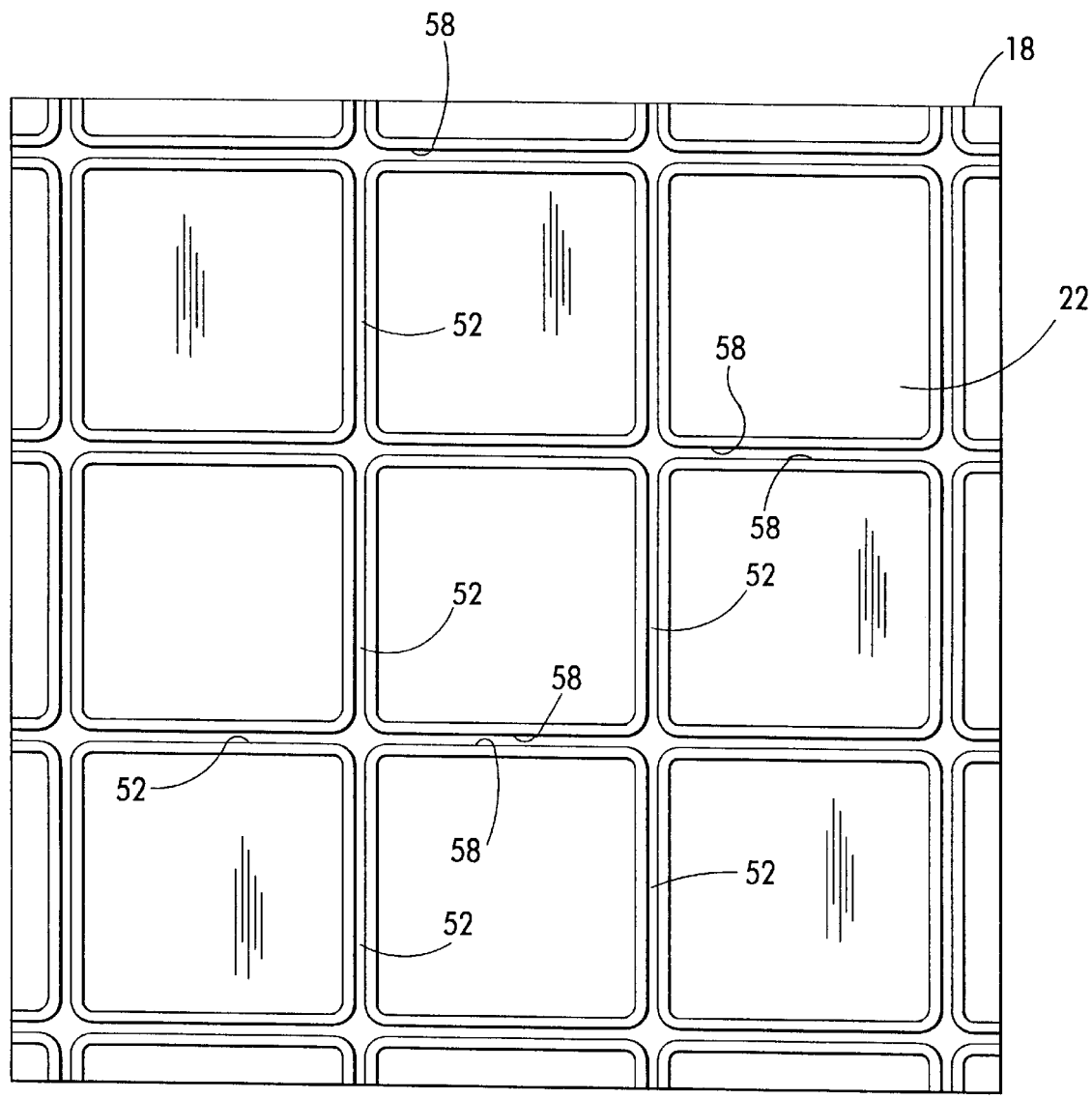
FIG. 5 is a plan view showing an inner layer of the second member of the structural element of FIG. 1.

As shown in FIGS. 2 and 4, a first interlocking formation machined into the inner layer 16 of the first member 12 comprises ribbing, formed by a series of longitudinal and lateral ribs 50 projecting from the first member and extending toward the second member 14. The ribs 50 intersect each other to form a generally square grid pattern. The inner layer 18 of the second member 14 includes a second formation comprising a plurality of grooves 52 extending longitudinally and laterally across the second member and intersecting each other in a checkerboard pattern (FIGS. 2 and 5). The grooves 52 are sized and arranged to receive free end margins of the ribs 50 for interlocking the first and second members 12, 14. In the first embodiment, the interconnecting means comprises the grooves 52. A film adhesive 56, paste adhesive or other suitable adhesive is interposed between the first formation and the second formation for adhering the first and second members 12, 14 to each other (FIG. 2). The adhesive 56 may be omitted without departing from the scope of the present invention. A solder or brazing material may also be used.

The ribs 50 preferably have a height greater than the depth of the grooves 52 so that the outer layers 28, 30 of the first and second members 12, 14 are spaced a distance apart. The ribs 50 are designed to provide structural support between the first and second members 12, 14 and have a height (generally the spacing between the outer layers 28, 30 of the first and second members) and width (generally corresponding to the width of the grooves 52) sufficient to withstand loads applied to the structural element 10 and transferred to the ribs. The height of the ribs 50 may vary over the width or the length of the structural element 10 to vary the thickness of the structural element. The grooves 52 are generally rectangular shaped in transverse cross-section and preferably have a width slightly greater than the width of the ribs 50 so that outer surfaces 60 of the ribs are in contact with inner faces 58 of the grooves (FIGS. 2 and 5). The ribs 50 and grooves 52 are configured to form a plurality of generally rectangular enclosures as viewed in plan view (FIGS. 4 and 5). The ribs 50 and grooves 52 may also be configured in other matching geometric formations (closed or otherwise), such as circles, and may have cross-sectional configurations other than the one shown. The number of interconnecting ribs 50 and grooves 52 may also vary as long as at least one rib and one groove are provided to connect the first and second members 12, 14. It is to be understood that other types of interlocking arrangements may be used without departing from the scope of this invention.

Figure 6:
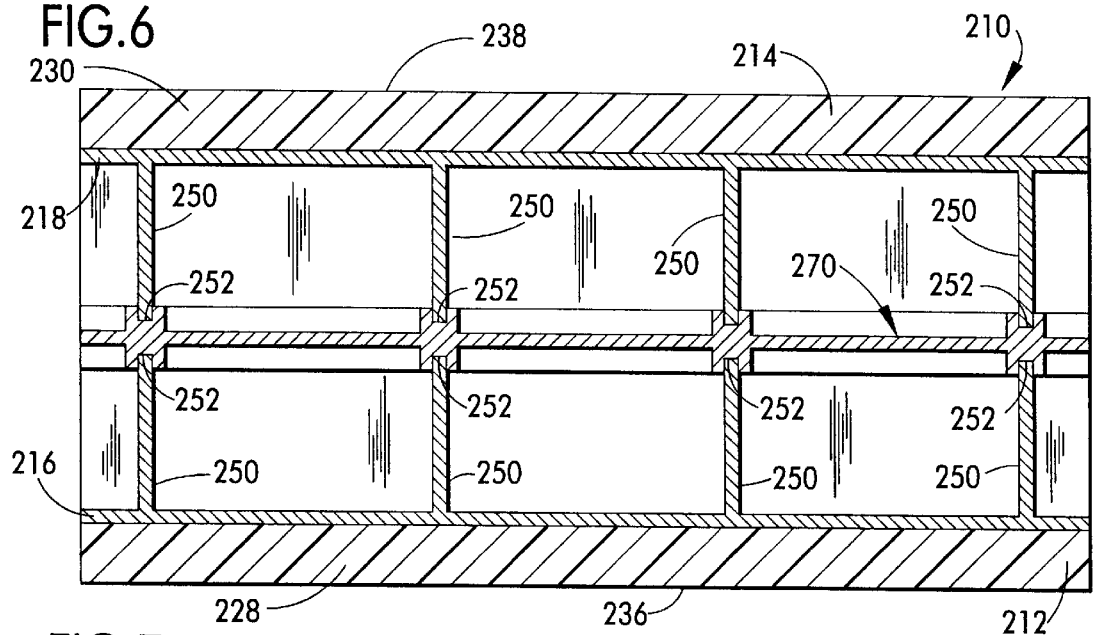
FIG. 6 is a cross-sectional view of a second embodiment of a structural element of the present invention.
Figure 7:
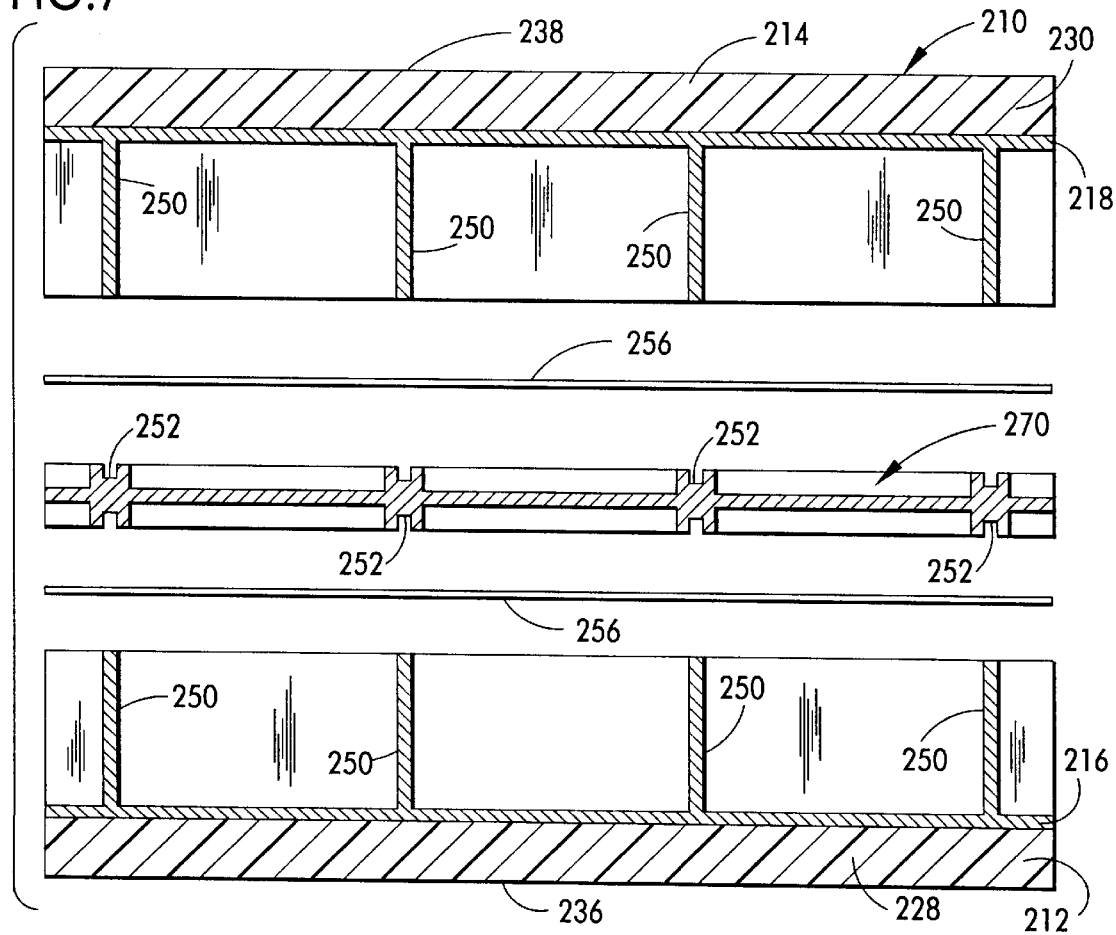
FIG. 7 is an exploded cross-sectional view of the structural element of FIG. 6.

A second embodiment of the present invention is shown in FIGS. 6 and 7, and generally indicated at 210. (Elements of the second, third and fourth embodiments which correspond to the same or similar elements in the first embodiment are indicated by the same reference numeral with the addition of a prefix "2", "3" or "4" corresponding to the number of the embodiment. Thus, a description of most such corresponding elements is omitted from the discussion of the second, third and fourth embodiments.) The inner layers 216, 218 of the first and second members 212, 214 have ribs 250 machined therein so that both the first and second members have configurations as described above for the first member 12 of the first embodiment 10. A connecting member, indicated generally at 270 (broadly, "interconnecting means"), is preferably formed of a machinable material and has grooves 252 formed in opposing sides. The grooves 252 receive respective free end margins of the ribs 250 of the first and second members 212, 214 to form the structural element 210. The ribs 250 of the first member 212 may have the same height as the ribs of the second member 214 or may have a height smaller than the ribs of the second member. The connecting member 270 is sized to have as small a height as possible to reduce the weight of the structural element 210 while still providing sufficient strength. A film adhesive 256, paste adhesive or other suitable adhesive may be placed on each side of the connecting member 270 between the first and second members 212, 214 and the connecting member. A solder or brazing material may also be used.

Figure 8:
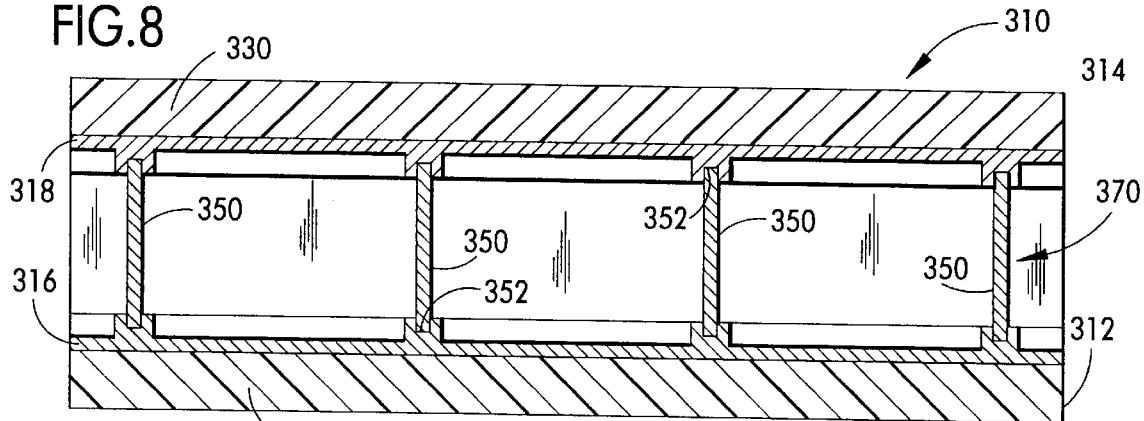
FIG. 8 is a cross-sectional view of a third embodiment of a structural element of the present invention.
Figure 9:
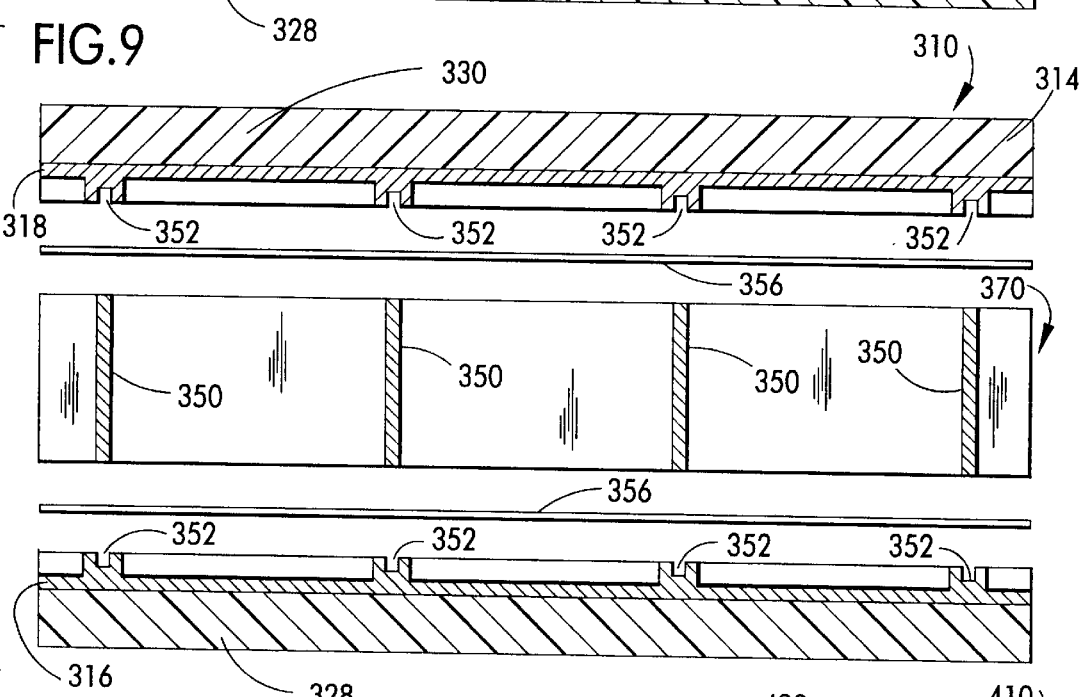
FIG. 9 is an exploded cross-sectional view of the structural element of FIG. 8.

FIGS. 8 and 9 show a third embodiment of the present invention, generally indicated at 310. The inner layers 316, 318 of the first and second members 312, 314 have grooves 352 machined therein as described above for the second member 14 of the structural element 10 of the first embodiment. A connecting member, indicated generally at 370 (broadly "interconnecting means") is formed with ribs 350 for mating with the grooves 352 formed in the inner layers 316, 318 of the first and second members 312, 314. The ribs 350 extend the full height of the connecting member 370 and have opposite end margins corresponding to the shape of the grooves 352. The connecting member 370 may be formed from metal or a composite material.

Figure 10:
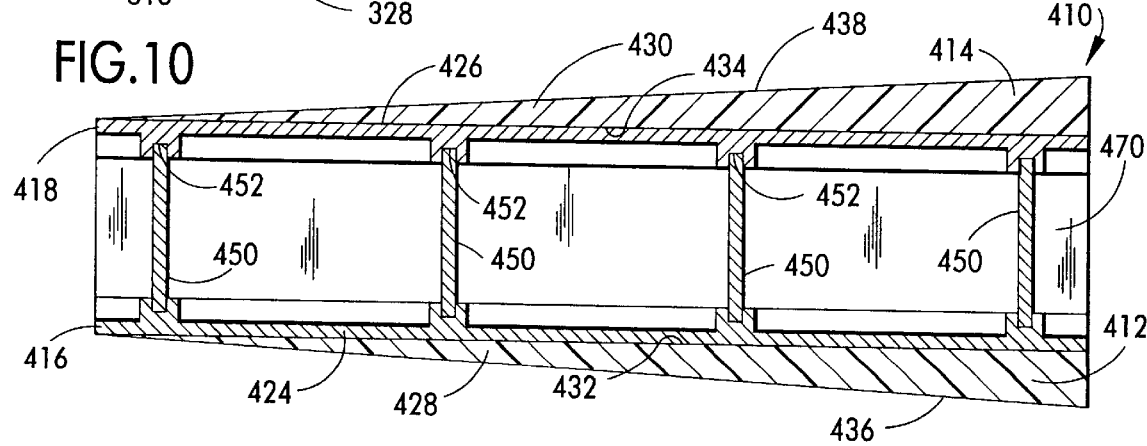
FIG. 10 is a cross-sectional view of a fourth embodiment of a structural element of the present invention.

A fourth embodiment of a structural element is shown in FIG. 10, and generally indicated at 410. The outer layers 428, 430 are tapered in thickness to reduce the weight of the structural element 410. The outer layers 428, 430 taper in thickness inwardly from a right side of the structural element 410 to a left side of the structural element (as it is oriented in FIG. 10). The taper may terminate prior to reaching the left side of the structural element 410 so that the outer surfaces 424, 426 of the inner layers 416, 418 are exposed near the left side of the structural element. In such event, the engagement of the outer surfaces 424, 426 of the inner layers 416, 418 and inner surfaces 432, 434 of the outer layers 428, 430 is still "continuous" over the area where the surfaces are engaged. The left side of the structural element 410 is exposed to minimal loads as compared with the right side of the structural element, thus allowing the outer layers 428, 430 to be reduced in thickness to provide a reduction in weight of the structural element for use in locations on an aircraft where the loads experienced by the structural element are low at one side. Other than the tapering thicknesses of the outer layers 428, 430, the construction of the structural element 410 is essentially the same as that of structural element 310. The tapered outer layers 428, 430 of the fourth embodiment may also be present in the structural elements 10, 210 of the first and second embodiments (not shown). The tapered thickness may also be formed in only one of the outer layers 428, 430 of the first and second members 412, 414.

A method of forming the structural element of all embodiments 10, 210, 310, 410 generally begins (as described herein for the first element) with first joining the inner layers 16, 18 to their corresponding outer layers 28, 30 in a face-to-face relationship. The inner and outer layers 16, 18, 28, 30 may be joined by cocuring the composite outer layer to the inner layer. Generally, the process of cocuring, which is well known in the trade, comprises first cleaning, degreasing and priming the outer surface 24, 26 of the inner layer 16, 18. An adhesive material may be partially cured to the outer surface 24, 26 of the inner layer 16, 18. The composite plies are then laid-up on the inner layer 16, 18 and a vacuum bag (not shown) is installed over the inner layer and composite plies. The inner layer 16, 18 and composite plies are cocured in an autoclave (not shown) or other suitable device to form the member 12, 14. It is to be understood that other methods may be used to join the inner and outer layers 16, 18, 28, 30 without departing from the scope of this invention.

In the first embodiment, the ribs 50 are then machined into the inner layer 16 of the first member 12 and grooves 52 are machined into the inner layer 18 of the second member 14 to form the first and second members (FIG. 2). A layer of film adhesive 56 may be applied to one or both of the inner surfaces 20, 22 of the inner layers 16, 18. The free end margins of the ribs 50 are then aligned with the grooves 52 and pressure is applied to the first and second members 12, 14 to force the ribs into interlocking engagement with the grooves to engage the first and second members to form the structural element 10.

The inner layers 16, 18 may also have the ribs 50 or grooves 52 already formed therein prior to joining the inner and outer layers. For example, a titanium or aluminum casting or forging of the inner layer 16, 18 may be formed with the ribs 50 or grooves 52, and joined to the outer layer 28, 30 in an as cast or rough machined condition. The ribs 50 or grooves 52 are machined into their final shape after joining the inner and outer layers 16, 18, 28, 30.

In order to form the structural element 210 of the second embodiment, the inner and outer layers 216, 218, 228, 230 are first joined together to form the first and second structural members 212, 214 as described above, or by any other suitable method (FIG. 7). Ribs 250 are machined into the inner layers 216, 218 of both the first and second members 212, 214 and grooves 252 are machined into opposite sides of the connecting member 270. Layers of film adhesive 256 may be applied to the free end margins of the ribs 250, or to the connecting member 270 or both prior to connecting the first and second members 212, 214. The first and second members 212, 214 are then engaged with the connecting member 270 to form the structural element 210.

A method of making the third and fourth embodiments 310, 410 is similar to the method described above for making the second embodiment 210, except that grooves 352, 452 are machined in the inner layers 316, 318, 416, 418 of the first and second members 312, 412, 314, 414 and ribs 350, 450 are machined into the connecting member 370, 470 (FIG. 9). The connecting member 370, 470 may also be formed from a composite material. The first and second members 312, 412, 314, 414 are then engaged with the connecting member 370, 470 to form the structural element 310, 410. The tapered outer layers 428, 430 may be formed during curing of the outer layers of the first and second members 412, 414 or the outer surfaces 436, 438 may be machined to form the tapered outer surfaces after joining the inner and outer layers.

It will be observed from the foregoing that the structural elements 10, 210, 310, 410 of this invention have numerous advantages. Importantly, the continuous face-to-face sealing interface between the inner and outer layers of the structural members provides a strong and reliable bond. Furthermore, the formation of the structural member from a composite material and a metal material or two different metal materials provides a structural member having a high strength to weight ratio and improved machinability as compared to a structural member formed entirely from one material.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A structural element comprising a first member and a second member interengaged with one another, each member comprising an inner layer formed from a first machinable material and having a substantially smooth outer surface, and an outer layer formed from a second material different from said first material and having a substantially smooth inner surface of a shape generally complementary to the shape of the outer surface of the inner layer, the inner and outer layers being joined together such that the outer surface of the inner layer and the inner surface of the outer layer are in substantially continuous, face-to-face engagement with each other, the inner layer of the first member having a first formation machined therein, and means for interconnecting the first formation of the first member with the second member thereby to form the structural element.

2. A structural element as set forth in claim 1 wherein said inner and outer layers are permanently joined together over substantially the entire area of engagement of their respective inner and outer layers.

3. A structural element as set forth in claim 2 wherein said inner and outer layers of the first and second members, respectively, are cocured together.

4. A structural element as set forth in claim 1 wherein said first formation comprises ribbing projecting from the first member toward the second member and providing a structural support between the first and second members.

5. A structural element as set forth in claim 4 wherein said interconnecting means comprises a second formation machined into the inner layer of the second member, the second formation comprising grooving receiving a free end margin of the ribbing therein for interlocking the first and second members.

6. A structural element as set forth in claim 5 wherein said ribbing has a height greater than the depth of the grooving such that the outer layers of the first and second members are spaced a distance apart by said ribbing.

7. A structural element as set forth in claim 4 wherein the inner layer of the second member has ribbing machined therein, and wherein said interconnecting means comprises a connecting member of machinable material, the connecting member having grooving machined in opposing surfaces of the connecting member and receiving respective free end margins of the ribbing of the first and second members.

8. A structural element as set forth in claim 1 wherein said first formation comprises grooving machined into the inner layer of the first member, wherein the inner layer of the second member has grooving machined therein, and wherein said interconnecting means comprises a connecting member having ribbing including opposite end margins received in the grooving of the inner layers of the first and second members, respectively.

9. A structural element as set forth in claim 1 wherein said outer layers are formed from a composite material and said inner layers are formed from a metal material.

10. A structural member for use in forming a structural element having the structural member and another structural member interengaged with one another, the structural member comprising an inner layer formed from a first machinable material and having a substantially smooth outer surface and an outer layer formed from a second material different from said first material and having a substantially smooth inner surface of a shape complementary to the shape of the outer surface of the inner layer, the inner and outer layers being joined together such that the outer surface of the inner layer and the inner surface of the outer layer are in substantially continuous, face-to-face engagement with each other, the inner layer having an interlocking formation machined therein for interconnecting the structural member with said other structural member.

11. A structural member as set forth in claim 10 wherein said inner and outer layers are cocured together.

12. A structural member as set forth in claim 10 wherein said interlocking formation on the inner layer of the first member comprises ribbing adapted to project from the first member toward said other structural member and provide structural support between the structural members.

13. A structural member as set forth in claim 10 wherein said interlocking formation on the inner layer of the structural member comprises grooving.

14. A structural member as set forth in claim 10 wherein said outer layer is formed from a composite material and said inner layer is formed from a metal material.

15. A method of forming a structural element comprising the steps of:

joining an inner layer formed of a first machinable material to an outer layer formed from a second material different from said first material so that the inner and outer layers are in face-to-face relationship to form a first member;

machining a first interlocking formation into the inner layer of the first member;

machining a second interlocking formation into a machinable element;

engaging the first and second interlocking formations to form said structural element.

16. A method as set forth in claim 15 wherein the step of machining a first interlocking formation comprises machining ribbing into the inner layer of the first member.

17. A method as set forth in claim 16 wherein the step of machining a second interlocking formation comprises machining grooving into an inner layer of a second member having an outer layer joined to said inner layer.

18. A method as set forth in claim 16 wherein said step of machining a second interlocking formation comprises machining grooving into an upper and lower surface of a connecting member, and wherein said step of engaging the first and second interlocking formations comprises the steps of engaging said first member with the connecting member.

19. A method as set forth in claim 15 wherein said step of machining a first interlocking formation comprises machining grooving into said inner layer of the first member, wherein said step of machining a second interlocking formation comprises machining grooving into an inner layer of a second member, and wherein said step of engaging the interlocking formations comprises the steps of engaging said first member with a connecting member having ribbing formed therein and engaging said second member with the connecting member.

20. A method as set forth in claim 15 wherein said step of joining said inner and outer layers comprises cocuring the inner and outer layers to form said first member.

* * * * *